US006417843B1

(12) United States Patent
Stephens et al.

(10) Patent No.: US 6,417,843 B1
(45) Date of Patent: *Jul. 9, 2002

(54) MOUSE WITH CUSHIONING PADS

(75) Inventors: Brian Stephens, Dun Laoghaire; Peter Sheehan, Bray, both of (IE); Aldo Bussien, Vullierens (CH); William J Sheehan, Menlo Park, CA (US)

(73) Assignee: Logitech Europe S.A. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,378

(22) Filed: May 11, 1998

(51) Int. Cl.[7] ................................................ G09G 5/08
(52) U.S. Cl. ..................... 345/167; 345/156; 248/118.1
(58) Field of Search ................................. 345/163, 164, 345/167, 156, 157, 158, 159, 160, 169, 165; 248/118, 118.1, 118.3, 118.5, 918

(56) References Cited

U.S. PATENT DOCUMENTS

| 4,464,652 A | | 8/1984 | Lapson et al. ............... 340/710 |
| 4,533,830 A | | 8/1985 | Beauprey ..................... 250/231 |
| 4,538,476 A | | 9/1985 | Luque ......................... 74/471 |
| D281,776 S | | 12/1985 | Griffin ........................ D13/32 |
| 4,775,255 A | * | 10/1988 | Langley ....................... 400/485 |
| 4,862,165 A | | 8/1989 | Gart ............................ 341/20 |
| D337,321 S | | 7/1993 | Koh et al. .................. D14/114 |
| 5,340,067 A | * | 8/1994 | Martin et al. ............. 248/118.5 |
| 5,428,368 A | | 6/1995 | Grant .......................... 345/163 |
| 5,530,455 A | * | 6/1996 | Gillick et al. ............... 345/163 |
| 5,570,112 A | * | 10/1996 | Robinson .................... 345/163 |
| 5,576,733 A | | 11/1996 | Lo .............................. 345/163 |
| 5,581,277 A | | 12/1996 | Tajiri .......................... 345/163 |
| 5,730,403 A | * | 3/1998 | Johnson ...................... 248/118 |
| 5,841,425 A | * | 11/1998 | Zenz, Sr. ..................... 345/163 |
| 5,894,302 A | * | 4/1999 | Scenna et al. .............. 345/163 |
| 5,912,661 A | * | 6/1999 | Siddiqui ..................... 345/163 |
| 5,923,318 A | * | 7/1999 | Zhai et al. .................. 345/157 |

OTHER PUBLICATIONS

General Product Bulletin, "Santoprene™", Advanced Elastomer Systems, Inc., 1996.

* cited by examiner

*Primary Examiner*—Vijay Shankar
*Assistant Examiner*—Mansour M. Said
(74) *Attorney, Agent, or Firm*—Townsend and Townsend and Crew LLP

(57) ABSTRACT

A pointing device with a planar element for supporting it on a horizontal surface. On top of the planar element is a housing having a palm and finger-supporting surface extending from a thumb-side to a small-finger side, and from back to front across the planar element. A soft-grip is coupled to the palm and finger-supporting surface and is made of material which is more resilient than the rest of the housing, and is also less porous than foam so as to be resistant to soiling.

16 Claims, 3 Drawing Sheets

MOUSE WITH CUSHIONING PADS

BACKGROUND OF THE INVENTION

The present invention relates to computer pointing devices, and in particular to a mouse or track ball with improved gripping surfaces.

A multitude of designs have been developed for mice and track balls for computers. Recently, emphasis has been placed upon both providing more functionality and making the pointing device easier to hold and rest a hand on. More functionality is typically provided by using more buttons, adding a roller, or adding a side, thumb-button. A multitude of different shapes have been devised to enhance the comfort of the mouse and support the hand in a natural, resting position.

Examples of placing a soft foam material on a mouse are shown in U.S. Pat. Nos. 5,570,112 and 5,581,277. The '112 patent shows a soft foam rubber material on the top of the mouse. The '277 patent shows a partial sphere on top of a mouse to support a palm, and the sphere can be made of hard or soft material. A disadvantage of foam is its tendency to absorb dirt, and the greater difficulty of handling soft foam material during manufacturing.

SUMMARY OF THE INVENTION

The present invention provides a pointing device with a planar element for supporting it on a horizontal surface. On top of the planar element is a housing having a palm and finger-supporting surface extending from a thumb-side to a small-finger side, and from back to front across the planar element. A cushion grip is coupled to the palm and finger-supporting surface and is made of material which is more resilient than the rest of the housing, and is also less porous than foam so as to be resistant to soiling. Such a material may not provide the cushioning of foam, but it does provide a soft, luxurious feel.

In a preferred embodiment, two cushion grips are used, a first being substantially vertically mounted along the thumb-supporting surface, and a second being mounted substantially vertically along the small-finger-supporting surface. Thus, the cushion grips on two sides allow the mouse to be grasped between the thumb and small fingers with the small finger and thumb being cushioned during such grasping.

In one embodiment, the small-finger side is curved to support the palm near the back, and overhang the horizontal support surface near the front. The thumb-side similarly overhangs the horizontal support surface near the front.

In addition, in alternate embodiments, a thumb-button is provided on the thumb-side housing, with the cushioning pad preferably at least partially surrounding the thumb-button. The cushioning pads are preferably made to have a flexible center region, and a harder peripheral region. The harder peripheral region facilitates manufacturability and attachment of the cushioning pad to the housing.

For a fuller understanding and advantages, reference should be made to the following description taken in conjunction with the accompanying drawings.

DETAILED DESCRIPTION OF THE PREFERRED EMBODIMENTS

Figure 1:
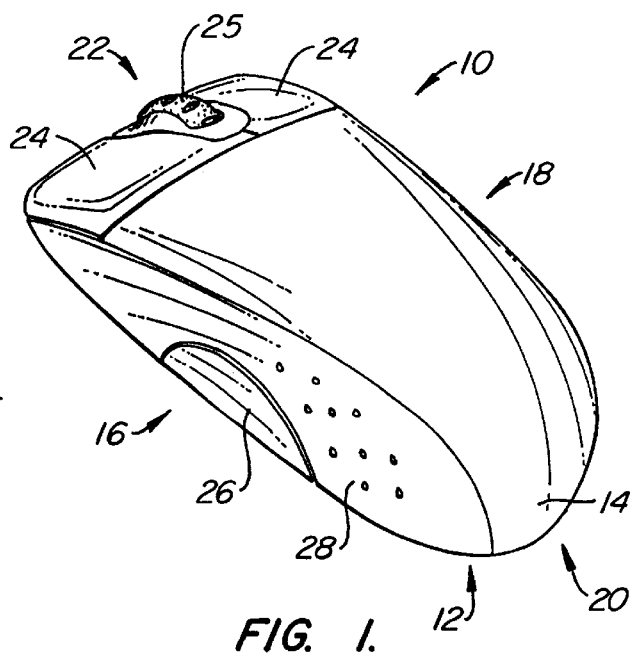
FIG. 1 is a perspective view of a first embodiment of a mouse according to the present invention.

FIG. 1 illustrates a mouse 10 according to the present invention. The mouse has a bottom, planar element 12 upon which a housing 14 is mounted. Housing 14 has a thumb-side 16 and a small-finger side 18, as well as a back end 20 and a front end 22. Along the top of front end 22 are two finger actuated buttons 24 and a roller 25. Thumb-side 16 includes a thumb button 26. A cushioning pad 28 is mounted on thumb-side 16.

Thumb-pad 28 is shown substantially surrounding button 26, and covering most of thumb-side 16. Alternately, it could cover only a portion near the button 26. Cushioning-pad 28 is made of a resilient material of lower durometer value than the rest of housing 14. The soft pad could be made from thermosets or thermoplastics. In one embodiment, cushioning pad 28 is made of silicon rubber, while housing 14 is made of plastic. In another embodiment, cushioning pad 28 is made of Santoprene™ made by Advanced Elastomer Systems (AES), preferably code 8010. A preferred mixture is AES plus 5% Dow Corning Silicon.

Figure 2:
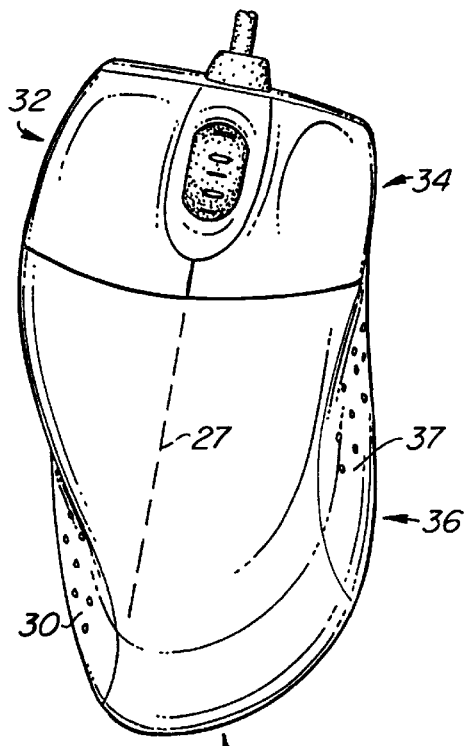
FIG. 2 is a top, plan view of the embodiment of FIG. 1.

FIG. 2 is a top view of the embodiment of FIG. 1. As can be seen, a back portion 30 of thumb-side 16 is exposed to view from the top of the mouse. A front portion 32 is not exposed, with the housing overhanging the horizontal surface, and the thumb-side curving inward. Similarly, on the small-finger side, there is an overhang 34 near the front, while the back portion 36 is curved to expose it to view from the top of the mouse. Preferably, a second cushioning pad 37 is attached to small finger side 18. Cushioning pad 37 is preferably made of the same material as cushioning pad 28.

As can be seen in FIG. 2, back end 20 of housing 14 curves to the right (for a right-handed user), so that the majority of the back portion of the housing is to the right of the center of front portion 22. This is illustrated by dotted line 27.

Figure 3:
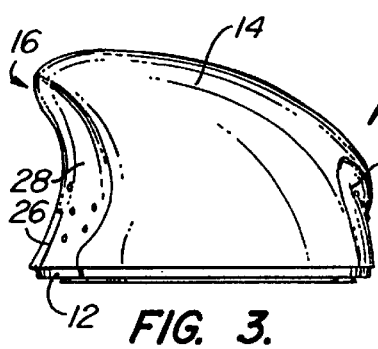
FIG. 3 is a rear, plan view of the embodiment of FIG. 1.
Figure 4:
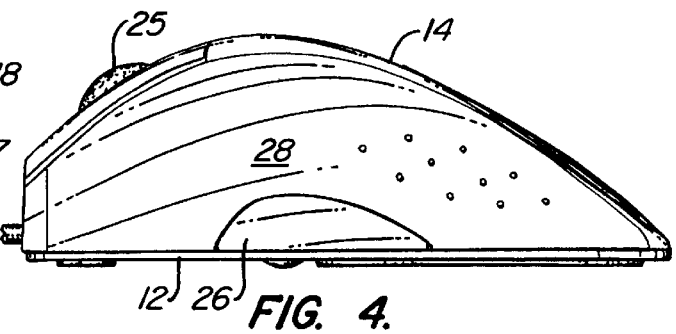
FIG. 4 is a left, plan view of the embodiment of FIG. 1.
Figure 5:
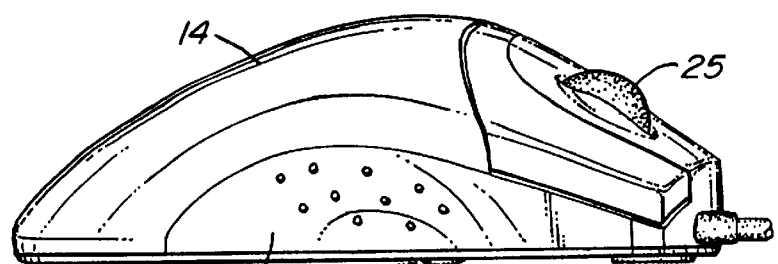
FIG. 5 is a right, plan view of the embodiment of FIG. 1.

As can be seen in the rear view of FIG. 3, the top of housing 14 slopes downward from thumb side 16 to small finger side 18.

Figure 8:
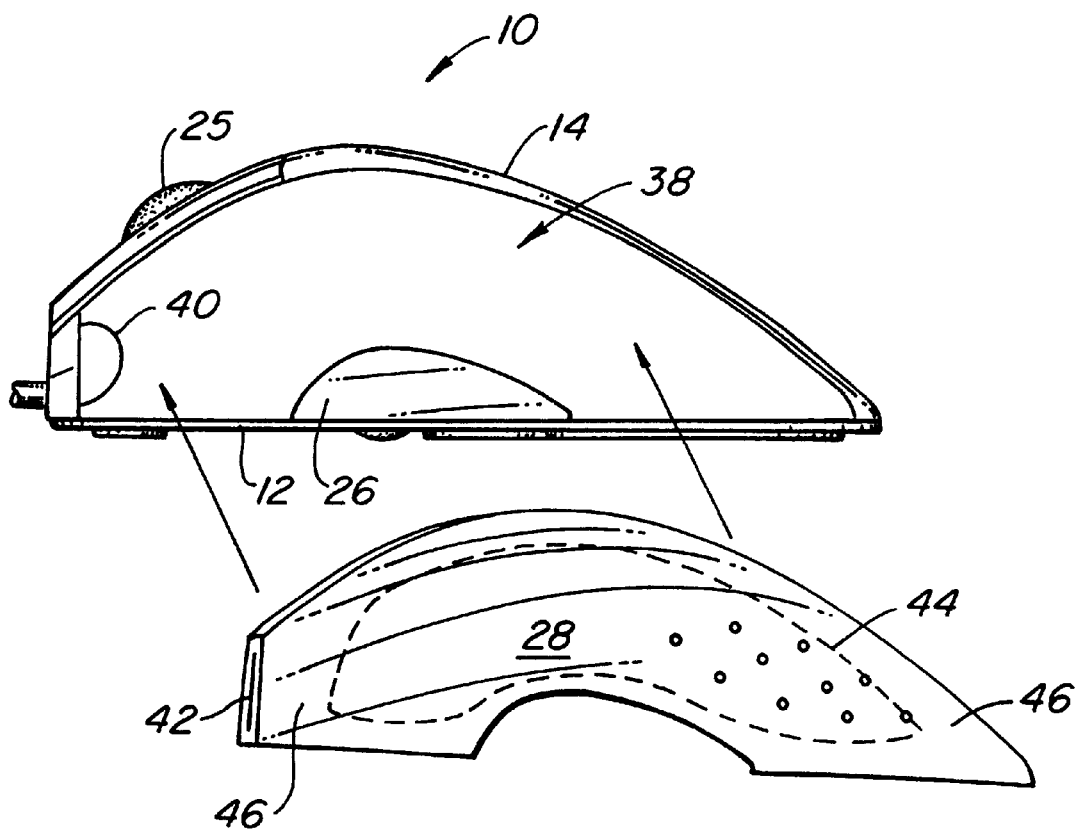
FIG. 8 is a diagram illustrating the mounting of a cushioning pad in the mouse of FIG. 1.

FIG. 8 illustrates the assembly of the cushioning pad on the thumb-side of FIG. 1. Mouse 10 is shown without the cushioning-pad 28 having been assembled yet. As can be seen, an open area 38 forms a receptacle for the cushioning-pad. The housing includes an extending tongue 40. Tongue 40 will engage a groove 42 in the end of cushioning-pad 28. The other edge of the cushion 28 will press fit into opening 38 of mouse 10. Preferably, pad 28 has a central region, marked by dotted line 44, which is softer and more flexible than a periphery region 46. Periphery region 46 has a higher durometer value than the central region, providing a better snap-fit connection to the mouse housing.

In one embodiment, cushioning-pad 28 includes a number of core elements 48 in the central region. The core elements can be of a softer, more compressible material than the rest of the cushioning-pad, providing added compressibility and springiness to the central portion of the pad.

Figure 6:
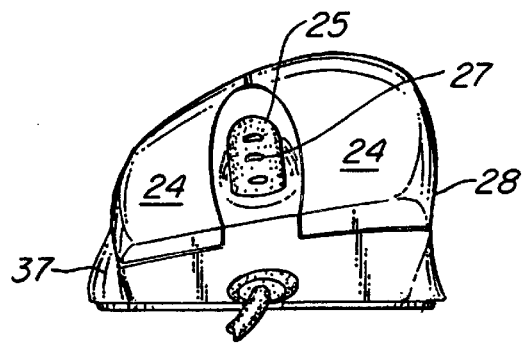
FIG. 6 is a front, plan view of the embodiment of FIG. 1.
Figure 7:
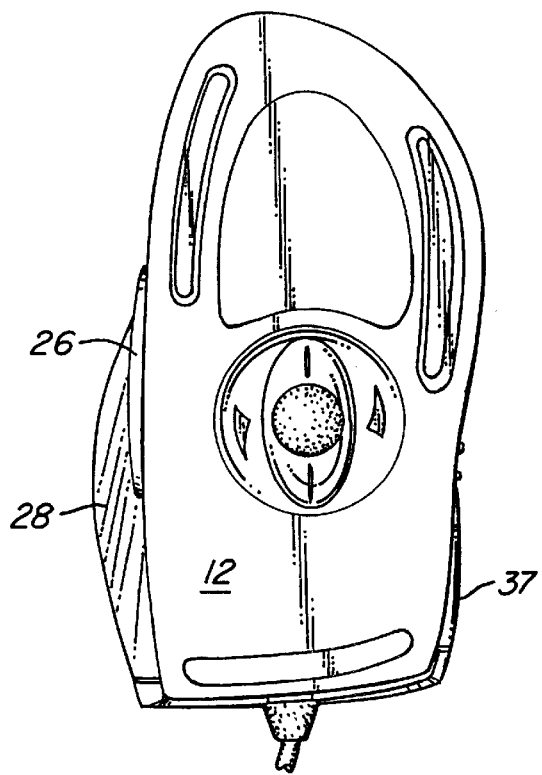
FIG. 7 is a bottom, plan view of the embodiment of FIG. 1.

Roller 25 is preferably covered with a soft material, and may have a texture or bumps 27 (FIG. 6). The bumps help avoid slippage of the user's finger when operating the roller.

As will be understood by those of skill in the art, the present invention may be embodied in other specific forms without departing from the spirit or essential characteristics thereof. For example, a single cushioning-pad could be used instead of two, or the thumb and small-finger curved-side shapes could be used without soft cushioning-pads. Alternately, a non-foam soft material could be placed on top of the mouse, or on other positions, to give a luxurious feel as opposed to providing the same cushioning as foam rubber. In another embodiment, a paint with a soft feel can be applied to the surface of the mouse rather than using a soft pad which is attached. One such paint is:

Varnish made by Eraco

Great Century Paint

Rabasan 4916 (Japan).

Accordingly, the foregoing description is intended to be illustrative, but not limiting, of the scope of the invention which is set forth in the following claims.

What is claimed is:

1. A pointing device for a computer comprising:
    a housing having a palm and finger supporting surface made of a first material and extending laterally between a thumb side and a small-finger side, and extending longitudinally between a front and a back side; and
    a soft grip coupled to said palm and finger supporting surface to cover a portion of said palm and finger supporting surface, said soft grip being made from a second material which is a single material that is more resilient than said first material and less porous than foam rubber so as to be resistant to soiling, the single material comprising a thermoset or thermoplastic.

2. The pointing device of claim 1, wherein said soft grip is formed from silicon rubber.

3. The pointing device of claim 1 wherein said soft grip is formed from Santoprene.

4. The pointing device of claim 1 further comprising a plurality of tactile bumps on said soft grip.

5. The pointing device of claim 1 further comprising a thumb button mounted on said thumb side of said housing, said thumb button being adjacent to and at least partially surrounded by said soft grip.

6. The pointing device of claim 1 wherein a top of said housing slopes downward from said thumb-side to said small-finger side.

7. The pointing device of claim 1 wherein a majority of a back of said housing is on the small-finger side of a perpendicular line bisecting a front face of said housing, such that said back side of said housing is offset from said front side.

8. The pointing device of claim 1 wherein said soft grip comprises:
    a first cushion grip on said thumb side of said housing; and
    a second cushion grip on said small finger side of said housing.

9. The pointing device of claim 1 wherein the second material contains no foam rubber.

10. The pointing device of claim 1, wherein the soft grip covers at least one of the thumb side and the small-finger side of the housing.

11. A pointing device for a computer comprising:
    a housing having a palm and finger supporting surface made of a first material and extending laterally between a thumb side and a small-finger side, and extending longitudinally between a front and a back side; and
    a soft grip coupled to said palm and finger supporting surface, said soft grip being made from a second material which is more resilient than said first material and less porous than foam so as to be resistant to soiling,
    wherein said palm and finger supporting surface includes a soft-grip receiving area, said soft-grip receiving area including a tongue formed integral to its periphery; and
    wherein said soft grip includes:
        a flexible center region;
        a rigid periphery and edge having a higher durometer value than said center region; and
        a groove formed integral to said rigid, high-durometer edge, said groove being shaped to receive said tongue of said soft-grip receiving area.

12. The pointing device of claim 11, wherein said flexible center region of said soft grip includes a plurality of coring elements formed integral thereto to provide added compressibility and springiness.

13. A pointing device for a computer comprising:
    a housing having a palm and finger supporting surface made of a first material and extending laterally between a thumb side and a small-finger side, and extending longitudinally between a front and a back side; and
    a soft grip coupled to said palm and finger supporting surface to cover a portion of said palm and finger supporting surface, said soft grip being made from a second material which is more resilient than said first material and less porous than foam so as to be resistant to soiling,
    wherein said soft grip comprises a first cushion grip on said thumb side of said housing on which to place a thumb.

14. The pointing device of claim 13 wherein said soft grip comprises a second cushion grip on said small finger side of said housing on which to place a small finger.

15. The pointing device of claim 13 wherein said soft grip includes a plurality of tactile bumps thereon.

16. The pointing device of claim 13 further comprising a thumb button mounted on said thumb side of said housing, said thumb button being at least partially surrounded by said first cushion grip.

* * * * *